US012561321B2

(12) United States Patent
Haynes et al.

(10) Patent No.: US 12,561,321 B2
(45) Date of Patent: Feb. 24, 2026

(54) MATERIALIZED VIEW GENERATION AND PROVISION BASED ON QUERIES HAVING A SEMANTICALLY EQUIVALENT OR CONTAINMENT RELATIONSHIP

(71) Applicant: Microsoft Technology Licensing, LLC, Redmond, WA (US)

(72) Inventors: Brandon Barry Haynes, Seattle, WA (US); Jyoti Leeka, Sunnyvale, CA (US); Anna Pavlenko, Edmonds, WA (US); Rana Alotaibi, Laguna Beach, CA (US); Alekh Jindal, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 73 days.

(21) Appl. No.: 17/734,026

(22) Filed: Apr. 30, 2022

(65) Prior Publication Data

US 2023/0350892 A1      Nov. 2, 2023

(51) Int. Cl.
 *G06F 16/2453* (2019.01)
 *G06N 20/00* (2019.01)
(52) U.S. Cl.
 CPC .... *G06F 16/24539* (2019.01); *G06F 16/2454* (2019.01); *G06N 20/00* (2019.01)
(58) Field of Classification Search
 CPC .......... G06F 16/24539; G06F 16/2454; G06N 20/00
 See application file for complete search history.

(56) References Cited

U.S. PATENT DOCUMENTS

| | | | |
|---|---|---|---|
| 11,068,482 B2 | 7/2021 | Jindal et al. | |
| 2007/0083489 A1* | 4/2007 | Lawande | ............ G06F 16/2456 |
| 2018/0113888 A1* | 4/2018 | Peña Muñoz | ........... G06F 16/56 |

(Continued)

OTHER PUBLICATIONS

"International Search Report and Written Opinion issued in PCT Application No. PCT/US23/017000", Mailed Date: Jun. 19, 2023, 9 Pages.

(Continued)

*Primary Examiner* — Van H Oberly
*Assistant Examiner* — Samuel C Sharpless, III
(74) *Attorney, Agent, or Firm* — Weaver IP L.L.C.

(57) ABSTRACT

Embodiments described herein are directed to generating and returning materialized views for queries (or subexpressions thereof) having a particular relationship with each other. For instance, machine learning-based techniques may be utilized to identify query subexpressions that have at least one of a semantically equivalent relationship or a containment relationship with each other. Responsive to identifying such relationship(s), a materialized view may be generated for the identified subexpressions. When a query is subsequently received, machine learning-based techniques may be utilized to determine whether a subexpression of the query possesses at least one of a semantically equivalent relationship or a containment relationship with another subexpression for which a materialized view has been generated. Responsive to determining that such a subexpression of the query possesses one or more of such relationships, the materialized view generated for the other subexpression is returned.

20 Claims, 6 Drawing Sheets

(56) References Cited

U.S. PATENT DOCUMENTS

2019/0318025 A1* 10/2019 Jindal .............. G06F 16/24539
2022/0083552 A1* 3/2022 Gupta .................... G06F 16/27

OTHER PUBLICATIONS

"calcite_tests.json", Retrieved From: https://github.com/georgia-tech-db/spes/blob/main/testData/calcite_tests.json, Jan. 1, 2021, 23 Pages.

Agrawal, et al., "Automated Selection of Materialized Views and Indexes for SQL Databases", In Proceedings of the 26th International Conference on Very Large Databases, Sep. 10, 2000, pp. 496-505.

Goldstein, et al., "Optimizing Queries Using Materialized Views: A Practical, Scalable Solution", In Proceedings of the ACM SIGMOD International Conference on Management of Data, May 21, 2001, pp. 331-342.

Hayek, et al., "Improved Cardinality Estimation by Learning Queries Containment Rates", In Proceedings of 23rd International Conference on Extending Database Technology, Mar. 30, 2020, pp. 157-168.

Jindal, et al., "Computation Reuse in Analytics Job Service at Microsoft", In Proceedings of International Conference on Management of Data, Jun. 10, 2018, pp. 191-203.

Jindal, et al., "Selecting Subexpressions to Materialize at Datacenter Scale", In Proceedings of the VLDB Endowment, vol. 11, Issue 7, Mar. 1, 2018, pp. 800-812.

Kipf, et al., "Learned Cardinalities: Estimating Correlated joins with Deep Learning", In Proceedings of 9th Biennial Conference on Innovative Data Systems Research, Jan. 13, 2019, 8 Pages.

Latpate, et al., "Simple Random Sampling", In Book of Advanced Sampling Methods, May 8, 2021, pp. 11-35.

Lemaitre, et al., "imbalanced-learn", Retrieved From: https://web.archive.org/web/20171102103402/https://github.com/scikit-learn-contrib/imbalanced-learn/blob/master/README.rst, Nov. 2, 2017, 3 Pages.

Marcus, et al., "Neo: A Learned Query Optimizer", In Proceedings of the VLDB Endowment, vol. 12, Issue 11, Jul. 1, 2019, pp. 1705-1718.

Mou, et al., "Convolutional Neural Networks over Tree Structures for Programming Language Processing", In Proceedings of Thirtieth AAAI Conference on Artificial Intelligence, Feb. 12, 2016, pp. 1287-1293.

Zhou, et al., "SPES: A Two-Stage Query Equivalence Verifier", In Repository of arXiv:2004.00481v1, Apr. 1, 2020, 17 Pages.

* cited by examiner

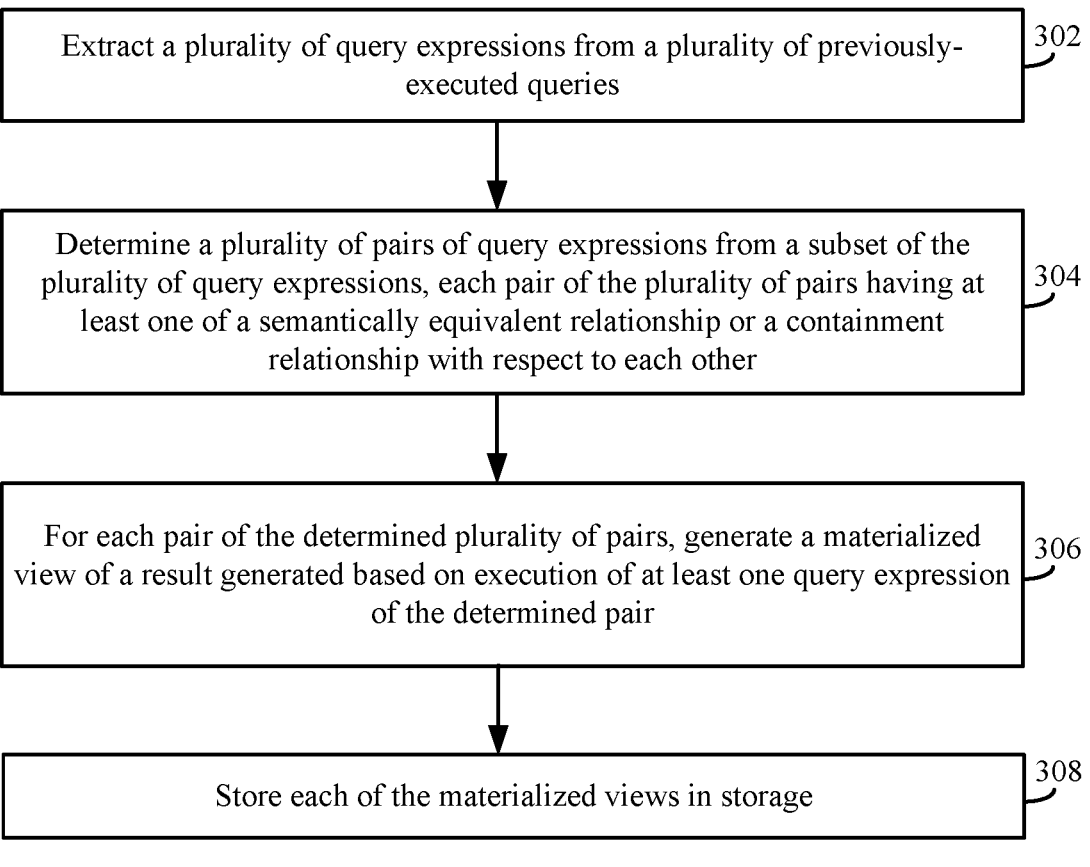

Extract a plurality of query expressions from a plurality of previously-executed queries ⎤302

Determine a plurality of pairs of query expressions from a subset of the plurality of query expressions, each pair of the plurality of pairs having at least one of a semantically equivalent relationship or a containment relationship with respect to each other ⎤304

For each pair of the determined plurality of pairs, generate a materialized view of a result generated based on execution of at least one query expression of the determined pair ⎤306

Store each of the materialized views in storage ⎤308

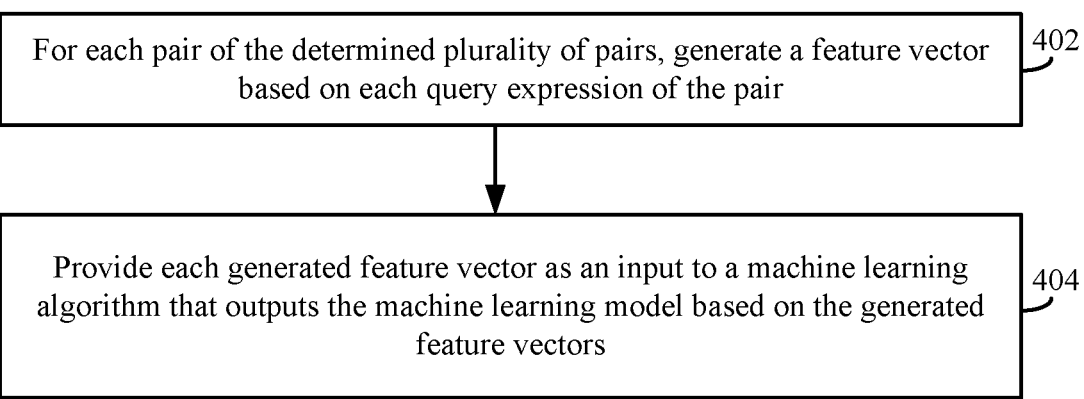

For each pair of the determined plurality of pairs, generate a feature vector based on each query expression of the pair ⎤402

Provide each generated feature vector as an input to a machine learning algorithm that outputs the machine learning model based on the generated feature vectors ⎤404

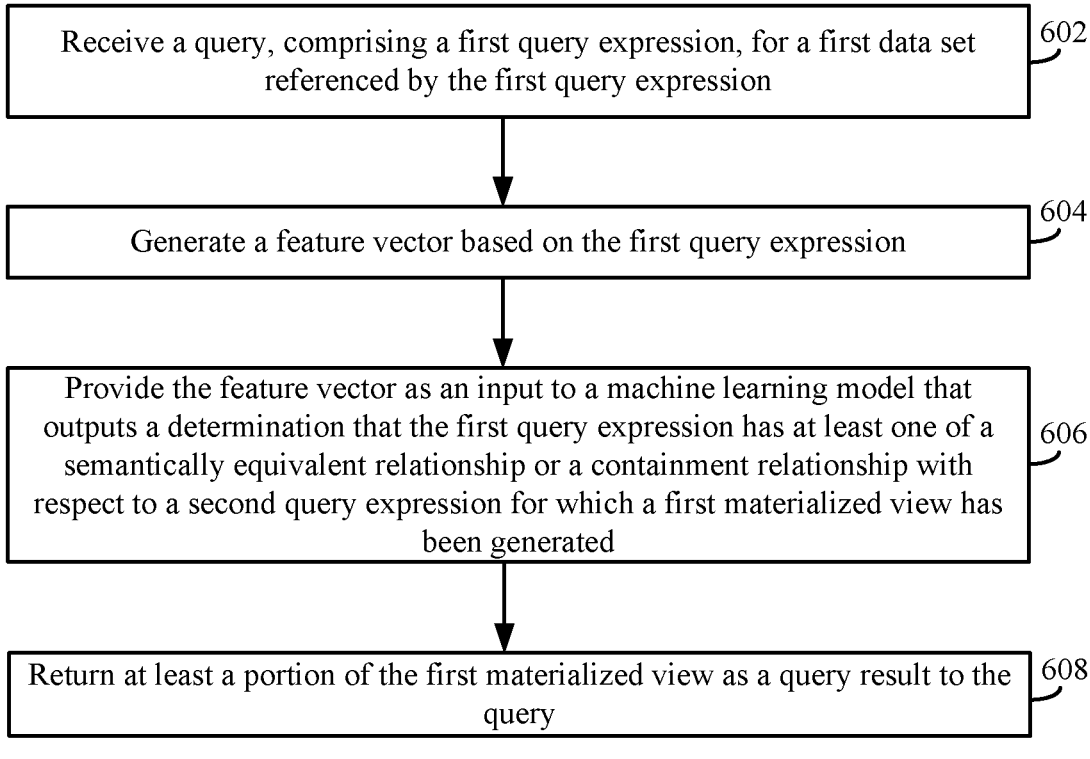

Receive a query, comprising a first query expression, for a first data set referenced by the first query expression — 602

Generate a feature vector based on the first query expression — 604

Provide the feature vector as an input to a machine learning model that outputs a determination that the first query expression has at least one of a semantically equivalent relationship or a containment relationship with respect to a second query expression for which a first materialized view has been generated — 606

Return at least a portion of the first materialized view as a query result to the query — 608

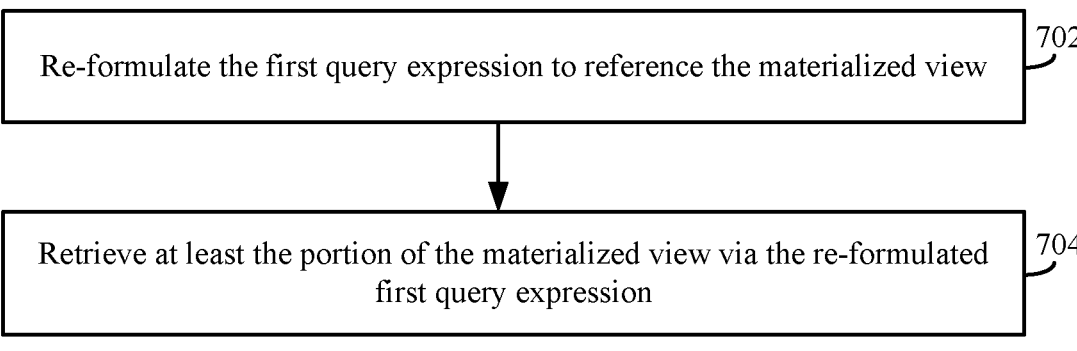

Re-formulate the first query expression to reference the materialized view — 702

Retrieve at least the portion of the materialized view via the re-formulated first query expression — 704

MATERIALIZED VIEW GENERATION AND PROVISION BASED ON QUERIES HAVING A SEMANTICALLY EQUIVALENT OR CONTAINMENT RELATIONSHIP

BACKGROUND

Continued advances in technology have enabled massive quantities of data to be generated and retained in data repositories. For instance, modern databases may include several petabytes of data, the majority of which is retained in large base tables. Despite an ever-increasing amount of computational power, executing certain queries against these base tables may require a significant amount of time. Accordingly, various tools, such as view materialization, have been developed to aid in reducing the time required to execute a query against a database.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer-readable storage mediums described herein are configured to generate and return materialized views for queries (or subexpressions thereof) having a particular relationship with each other. For instance, machine learning-based techniques may be utilized to identify query subexpressions that have at least one of a semantically equivalent relationship or a containment relationship with each other. Responsive to identifying such relationship(s), a materialized view may be generated for the identified subexpressions. When a query is subsequently received, machine learning-based techniques may be utilized to determine whether a subexpression of the query possesses at least one of a semantically equivalent relationship or a containment relationship with another subexpression for which a materialized view has already been generated. Responsive to determining that such a subexpression of the query possesses one or more of such relationships, the materialized view generated for the other subexpression is returned.

Further features and advantages, as well as the structure and operation of various example embodiments, are described in detail below with reference to the accompanying drawings. It is noted that the example implementations are not limited to the specific embodiments described herein. Such example embodiments are presented herein for illustrative purposes only. Additional implementations will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate example embodiments of the present application and, together with the description, further serve to explain the principles of the example embodiments and to enable a person skilled in the pertinent art to make and use the example embodiments.

FIG. 3 shows a flowchart of a method for generating a materialized view in accordance with an example embodiment.

FIG. 4 shows a flowchart of a method for generating a machine learning model for classifying a query as having a semantically equivalent relationship or a containment relationship with another query in accordance with an example embodiment.

FIG. 6 shows a flowchart of a method for returning a materialized view in accordance with an example embodiment.

FIG. 7 shows a flowchart of a method for re-formulating a query in accordance with an example embodiment.

Figure 1:
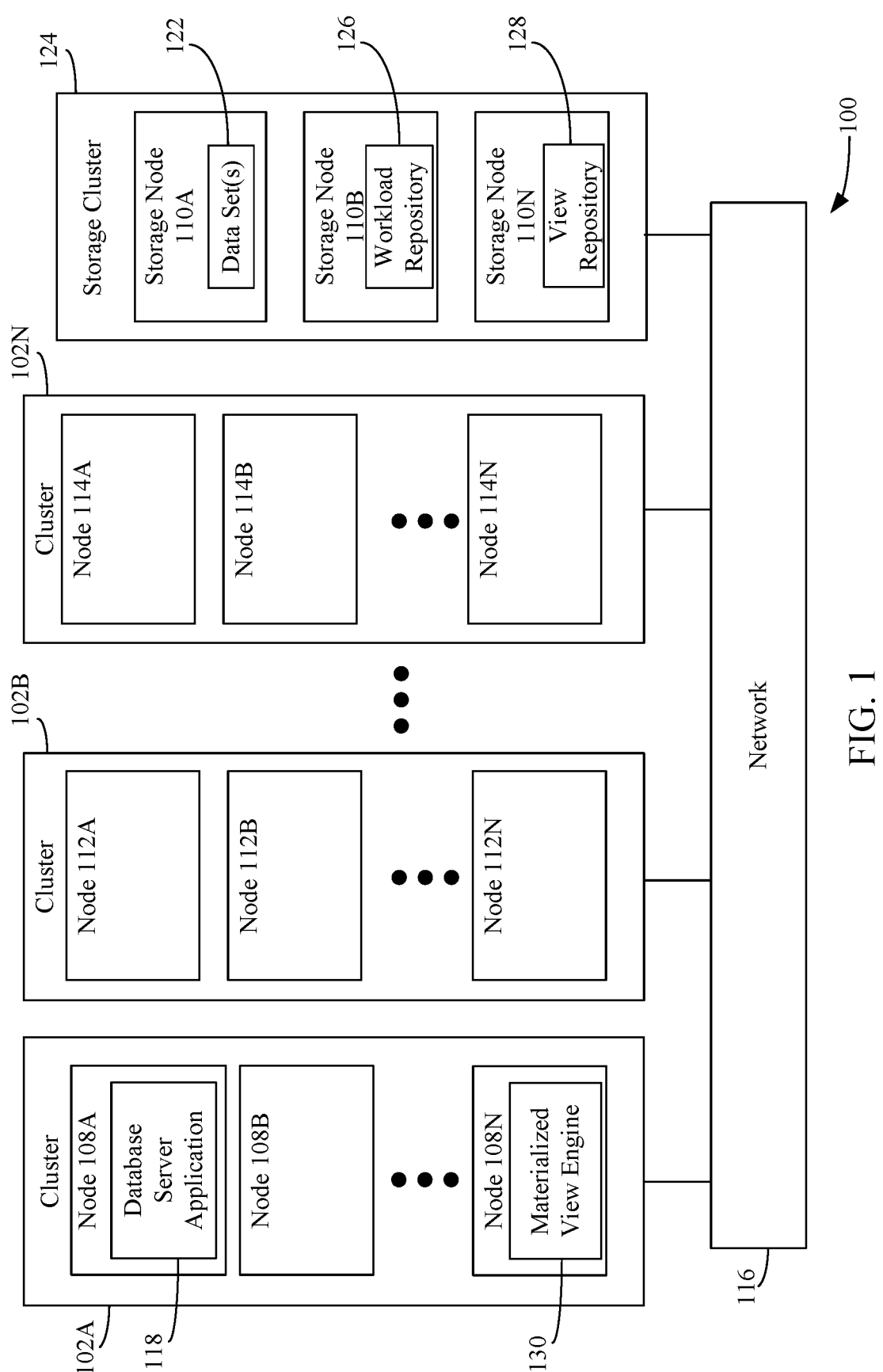
FIG. 1 shows a block diagram of an example network-based computing system configured to generate and return materialized views in accordance with an example embodiment.

The features and advantages of the implementations described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose numerous example implementations. The scope of the present application is not limited to the disclosed implementations, but also encompasses combinations of the disclosed implementations, as well as modifications to the disclosed implementations. References in the specification to "one implementation," "an implementation," "an example embodiment," "example implementation," or the like, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of persons skilled in the relevant art(s) to implement such feature, structure, or characteristic in connection with other implementations whether or not explicitly described.

In the discussion, unless otherwise stated, adjectives such as "substantially" and "about" modifying a condition or relationship characteristic of a feature or features of an implementation of the disclosure, should be understood to mean that the condition or characteristic is defined to within tolerances that are acceptable for operation of the implementation for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Numerous example embodiments are described as follows. It is noted that any section/subsection headings provided herein are not intended to be limiting. Implementations are described throughout this document, and any type of implementation may be included under any section/subsection. Furthermore, implementations disclosed in any section/subsection may be combined with any other implementations described in the same section/subsection and/or a different section/subsection in any manner.

II. Example Implementations

Embodiments described herein are directed to generating and returning materialized views for queries (or subexpressions thereof) having a particular relationship with each other. For instance, machine learning-based techniques may be utilized to identify query subexpressions that have at least one of a semantically equivalent relationship or a containment relationship with each other. Responsive to identifying such relationship(s), a materialized view may be generated for the identified subexpressions. When a query is subsequently received, machine learning-based techniques may be utilized to determine whether a subexpression of the query possesses at least one of a semantically equivalent relationship or a containment relationship with another subexpression for which a materialized view has been generated. Responsive to determining that such a subexpression of the query possesses one or more of such relationships, the materialized view generated for the other subexpression is returned.

By returning materialized views for subexpressions that are semantically equivalent or have a containment relationship with other subexpressions, the instances in which a materialized view is provided are increased, and the instances of query execution are reduced. Executing queries require several steps. For instance, the execution of a query requires the generation of a query plan, optimization of the query plan, and execution the optimized query plan. Such steps require many compute resources (e.g., processing cycles, memory, power, etc.). Utilizing a materialized view, however, avoids the execution of the query, as the data to be returned is already pre-computed. Accordingly, the embodiments described herein improve the functioning of a computing device on which the techniques described herein are implemented, as such compute resources are conserved.

Current approaches for generating and returning materialized views are limited in that they identify only syntactically identical expressions and are not scalable. The embodiments described herein expand such approaches by generating and returning materialized views based on semantically equivalent and containment relationships with other expressions. In addition, machine learning-based techniques that require a relatively small seed training set are utilized to identify such relationships, thereby enabling such techniques to be scalable to various computing environments including, but not limited to, a cloud-based computing environment that is configured to process hundreds of thousands of queries and maintain an enormous amount (e.g., petabtyes) of data. In addition, the techniques described herein require no changes to a query optimizer implemented by a database application, which are often cumbersome to modify due to their complex nature.

For example, FIG. 1 shows a block diagram of an example network-based computing system 100 configured to generate and return materialized views, according to an example embodiment. As shown in FIG. 1, system 100 includes a plurality of clusters 102A, 102B and 102N and a storage cluster 124. Each of clusters 102A, 102B and 102N and storage cluster 124 are communicatively coupled to each other via a network 116. Network 116 may comprise one or more networks such as local area networks (LANs), wide area networks (WANs), enterprise networks, the Internet, etc., and may include one or more of wired and/or wireless portions.

Clusters 102A, 102B and 102N and/or storage cluster 124 may form a network-accessible server set (e.g., a cloud-based environment). Each of clusters 102A, 102B and 102N may comprise a group of one or more nodes (also referred to as compute nodes) and/or a group of one or more storage nodes. For example, as shown in FIG. 1, cluster 102A includes nodes 108A-108N, cluster 102B includes nodes 112A-112N, and cluster 102N includes nodes 114A-114N. Each of nodes 108A-108N, 112A-112N and/or 114A-114N are accessible via network 116 (e.g., in a "cloud-based" embodiment) to build, deploy, and manage applications and services. Storage cluster 124 comprises one or more storage nodes 110A-110N. Each of storage node(s) 110A-110N comprises a plurality of physical storage disks that are accessible via network 116 and is configured to store data associated with the applications and services managed by nodes 108A-108N, 112A-112N, and/or 114A-114N.

As shown in FIG. 1, storage node 110A may comprise one or more data sets 122, respectively. Data set(s) 122 include databases and/or the like, in embodiments, which may be very large data sets such as for "Big Data" analytics and/or data warehousing. It is contemplated herein that data sets(s) 122 are to the order of petabytes, or more, in embodiments. Data set(s) 122 may include a plurality of data files. The data files may comprise structured, relational data, organized as rows of tables, having columns for the data. Examples of data files include, but are not limited to, a database file, a chunk, a group of one or more rows of the table (i.e., a rowgroup, partitions, etc.). In accordance with an embodiment, data set(s) 122 are part of the same database and/or may be distributed among storage node(s) 110A-110N.

In an embodiment, one or more of clusters 102A, 102B and 102N and/or storage node(s) 110A-110N may be co-located (e.g., housed in one or more nearby buildings with associated components such as backup power supplies, redundant data communications, environmental controls, etc.) to form a datacenter, or may be arranged in other manners. Accordingly, in an embodiment, one or more of clusters 102A, 102B and 102N and/or storage node(s) 110A-110N may be a datacenter in a distributed collection of datacenters.

Each of node(s) 108A-108N, 112A-112N and 114A-114N may comprise one or more server computers, server systems, and/or computing devices. Each of node(s) 108A-108N, 112A-112N and 114A-114N may be configured to execute one or more software applications (or "applications") and/or services and/or manage hardware resources (e.g., processors, memory, etc.), which may be utilized by users (e.g., customers) of the network-accessible server set. Node(s) 108A-108N, 112A-112N and 114A-114N may also be configured for specific uses. For example, as shown in FIG. 1, node 108A may be configured to execute a database server application 118, and node 108N may be configured to execute a materialized view engine 130. It is noted that instances of database server application 118 and/or materialized view 130 may be executing on other node(s) (e.g., node(s) 108B-108N, node(s) 112A-112N, and/or node(s) 114A-114N) in lieu of or in addition to nodes 102A and 108N, respectively. It is further noted that materialized view 130 may be incorporated in another application, such as database server application 118.

Node 108A (or any other node executing an instance of database server application 118) may be a control node configured to act as the query endpoint for incoming queries, to produce a distributed plan (e.g., an execution graph) for an incoming query, and to divide work for query processing among one or more of compute nodes 108B-108N, nodes 112A-112N, and nodes 114A-114N. That is, according to embodiments, node 108A is configured to transform an incoming query into a set of queries that are run against each distribution of a data set in parallel via one or more of nodes 108B-108N, nodes 112A-112N, and nodes 114A-114N.

Each query may comprise a plurality of subexpressions (or subqueries) (also referred herein as "expressions" for simplicity). A subexpression is a query that is included in another query statement. Database server application 118 may generate a query plan for each subexpression. Each query plan comprise a series of steps used to access data, such as data set(s) 122. The series of steps be organized via a tree-like structure comprising a plurality of nodes, where each node may represent a particular query operator (e.g., arithmetic operators, logical operators (e.g., join operations, column predicates, etc.), etc.). Database server application 118 may be configured to store generated query plans for queries (and its subqueries) in a query workload repository 126. Workload repository 126 may be configured to store query plans on a periodic basis. For example, workload repository 126 may store query plans generated for queries received by database server application 118 in the last N number of hours, days, weeks, months, etc. Accordingly, workload repository 126 stores a historical collection of query plans generated by database server application 118. Database server application 118 may also be configured to store various runtime statistics associated with query plan executions in workload repository 126. An example of runtime statistics includes, but is not limited to, a number of rows that returned as a result of a particular query plan execution.

Database server application 118 may be any database server application, including, but not limited to Microsoft® Azure SQL Database™ published by Microsoft® Corporation of Redmond, Washington. Database server application 118 is configured to execute statements to create, modify, and delete one or more data files of tables of data, indexes, and relationships in data set(s) 122, e.g., based on an incoming query.

Queries may be user-initiated or automatically generated by one or more background processes. Such queries may be configured to add data file(s), copy data file(s), merge data file(s) into a larger data file, re-organize (or re-cluster) data file(s) (e.g., based on a commonality of data file(s)) within a particular set of data files, delete data file(s) (e.g., via a garbage collection process that deletes unwanted or obsolete data), etc.

Materialized view engine 130 is configured to generate materialized views, which are pre-computed database objects that contain the results of a query. The database objects are copies (or "views") of the results of the query. Materialized views are stored separate from the base tables or data set(s) (e.g., data set(s) 122) from which the data was originally gathered and derived from a previously-executed query. For example, as shown in FIG. 1, materialized views may be stored in a view repository 128 in any of storage node(s) 110A-110N (e.g., storage node 110N, as shown in FIG. 1). When a query for data maintained by one of the materialized views is subsequently received, the materialized view is retrieved from storage in which the view is located (e.g., storage node 110N) as a query result. Because the data is pre-computed, querying a materialized view is faster than executing a query against the base table of the view. This performance difference can be significant when a query is run frequently or is sufficiently complex. As a result, materialized views can speed up expensive aggregation, projection, and selection operations, especially those that run frequently and that run on large data sets (e.g., data set(s) 122).

Materialized view engine 130 is configured to generate materialized views for queries (or subexpressions) having a particular relationship with each other. For instance, materialized view engine 130 may be configured to identify query subexpressions that have least one of a semantically equivalent relationship or a containment relationship with each other. Responsive to identifying such relationship(s), materialized view engine 130 may generate a materialized view for the identified queries. A first subexpression may have a semantically equivalent relationship with a second subexpression when both subexpressions yield a same query result but are syntactically different (i.e., the subexpressions utilize different syntax (e.g., operators, etc.)), but return the same results). For example, Code Snippets 1 and 2 shown below provide examples of two query subexpressions (Q1 and Q2) that are semantically equivalent:

```
Q1:
SELECT id
FROM EMP
WHERE id NOT IN
    (SELECT id FROM MANAGERs);
        (Snippet 1)
Q2:
SELECT id
FROM EMP AS e
LEFT OUTER JOIN MANAGERS AS m
    ON e.id = m.id
WHERE m.id IS NULL;
        (Snippet 2)
```

As shown above, both Code Snippets 1 and 2 are configured to return identifiers of employees that are not included in a table named MANAGERS (i.e., Snippets 1 and 2 are configured to return identifiers of employees that are not managers). Both snippets 1 and 2 accomplish the same task, but are syntactically different.

A first subexpression may have a containment relationship with another subexpression when the results of the first subexpression are included in the results of the second subexpression (i.e., the results of the first subexpression is a subset of the results of the second subexpression).

For example, Code Snippets 3 and 4 shown below provide examples of two query subexpressions (Q1 and Q2) that have a containment relationship:

```
Q1:
SELECT empid, deptname
FROM EMP
WHERE hire_date >= '2018-01-01'
    AND hire_date <= '2018-03-30'
        (Snippet 3)
Q2:
SELECT empid, deptname
FROM EMP
```

-continued

| WHERE hire__date >= '2016-01-01'; |
| --- |
| (Snippet 4) |

As shown above, the data requested by query subexpression Q1 of Snippet 3 is configured to receive data that is contained (i.e., included) in the data requested by query subexpression Q2 of Snippet 4.

When a new query for data is received, materialized view engine 130 is configured to determine whether a materialized view exists for the query by identifying a materialized view from materialized view(s) that have been generated for a previously-executed query that has at least one of the semantically equivalent relationship or the containment relationship.

Figure 2:
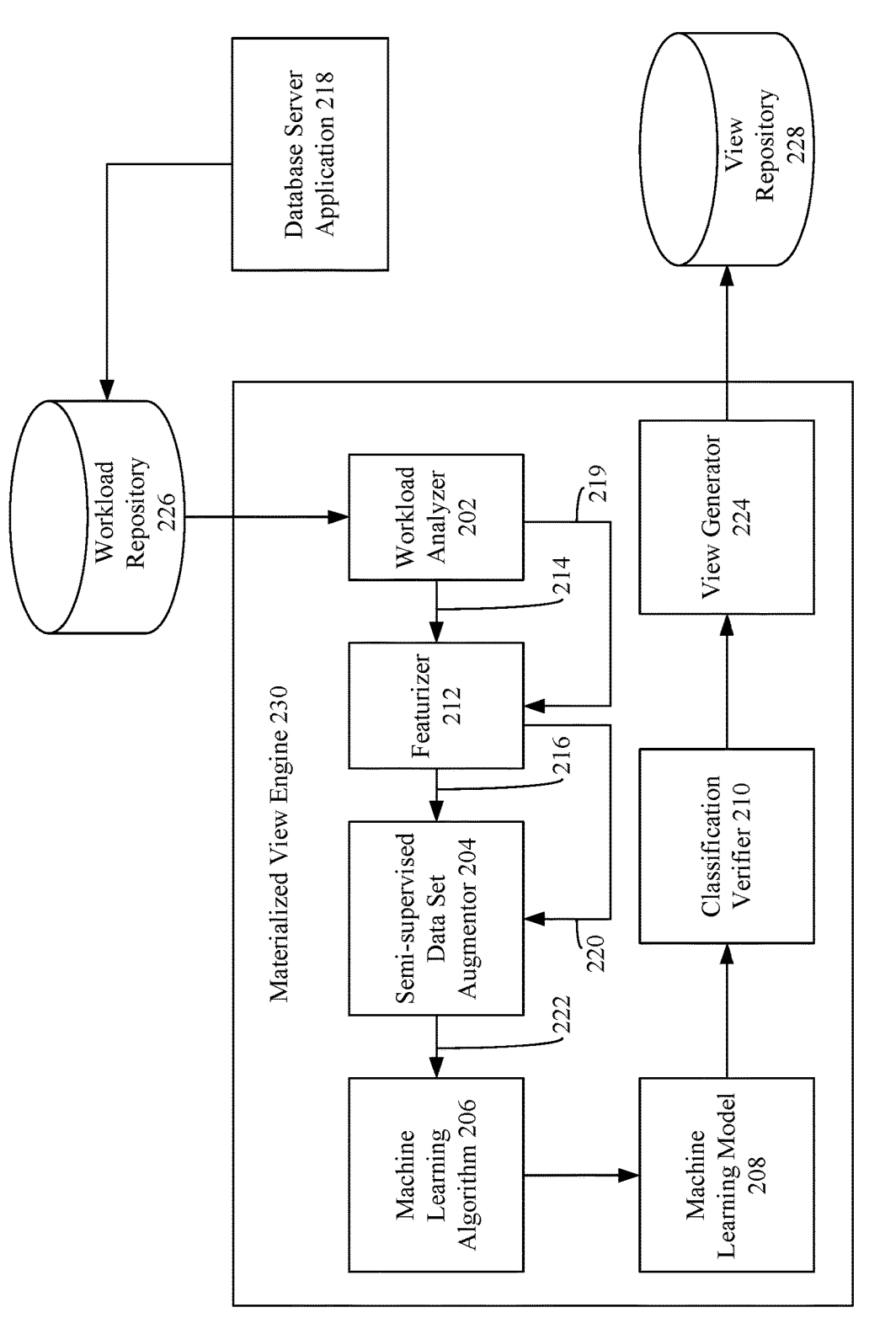
FIG. 2 depicts a block diagram of a system for generating a materialized view in accordance with an example embodiment.

FIG. 2 depicts a block diagram of a system 200 for generating a materialized view in accordance with an example embodiment. As shown in FIG. 2, system 200 comprises a database server application 218, a materialized view engine 230, a workload repository 226, and a materialized view repository 228. Database server application 218 is an example of database server application 118, as described above with reference to FIG. 1. Materialized view engine 230 is an example of materialized view engine 130, as described above with reference to FIG. 1. Workload repository 226 is an example of workload repository 126, as described above with reference to FIG. 1. Materialized view repository 228 is an example of materialized view repository 128, as described above with reference to FIG. 1.

Database server application 218 is configured to store query plans for queries (and its subqueries) that it generates in workload repository 226. As described above, workload repository 226 may be configured to store query plans on a periodic basis. Database server application 218 may also be configured to store various runtime statistics associated with query plan executions in workload repository 226.

As also shown in FIG. 2, materialized view engine 230 comprises a workload analyzer 202, a featurizer 212, a semi-supervised data set augmentor 204, a machine learning algorithm 206, a machine learning model 208, classification verifier 210, and a view generator 224. Workload analyzer 202 is configured to analyze past query workloads maintained by workload repository 226 to determine query subexpressions for which materialized views should be generated. Workload analyzer 202 may analyze past query workloads over a particular time interval (e.g., the last 7 days' worth of query workloads). To determine which query subexpressions from workload repository 226, should be analyzed, workload analyzer 202 may determine subexpressions that are issued periodically (e.g., hourly, daily, weekly, etc.) and/or that reference interesting table subsets. A table subset may be determined to be interesting if materializing one or more views for that table subset has the potential to reduce the computing cost (e.g., the number of processor cycles) of the workload significantly with respect to a threshold. For example, suppose the threshold is an N number of processor cycles, where N is a positive value. In accordance with such an example, if executing a subexpression that references a table subset would require a number of processor cycles that exceed N, then workload analyzer 202 may determine that the table subset is interesting. Equation 1, which is provided below, demonstrates an exemplary metric for determining the importance of a table subset. It is noted that other metrics may be utilized to determine interesting table subsets.

$$TS\text{--}Weight(T) = \sum_i Cost(Q_i) * \frac{\text{(sum of sizes of tables in } T)}{\text{(sum of sizes in all tables references in } Q_i)} \quad \text{(Equation 1)}$$

where T represents a particular table subset, TS-Weight(T) represents a metric for relative importance of a table subset, $Q_i$ represents a particular query i, and $Cost(Q_i)$ represents the cost for executing query $Q_i$. As shown in Equation 1, the summation occurs over queries in the workload where the table subset T occurs.

Workload analyzer 202 may be configured to select a subset of the subexpressions maintained by workload repository 226 that reference interesting table subsets for analysis. In accordance with an embodiment, workload analyzer 202 is configured to select a certain percentage (e.g., 10%) of such subexpressions. In such an example, if 1000 subexpressions were determined to be associated with interesting table sets, then 100 of such subexpressions would be selected for analysis. The remaining subexpressions (e.g., shown as remaining subexpressions 219) are provided to featurizer 212, which is described below.

Workload analyzer 202 may be configured to then determine subexpression pairs from among the subset that have a particular relationship. For example, workload analyzer 202 may be configured to determine subexpression pairs that have at least one of a semantically equivalent relationship or a containment relationship with each other, and/or subexpression pairs that do not have such relationships. Workload analyzer 202 may be configured to analyze the structure, properties, and/or syntax of the query subexpressions included in the subset to determine whether such relationship(s) may exist.

After determining query subexpression pairs having a semantically equivalent relationship, a containment relationship or neither relationship, workflow analyzer 202 may be configured to label such pairs accordingly. For instance, a query subexpression pair having a containment relationship may be labeled as having a containment relationship, a query subexpression pair having a semantically equivalent relationship may be labeled as having a semantically equivalent relationship, and a query subexpression pair having neither a containment relationship nor a semantically equivalent may be labeled as having no such relationships.

The labeled query subexpression pairs are utilized as a seed set for a machine learning algorithm that utilizes the seed set to learn what constitutes a subexpression pair having a semantically equivalent relationship, a subexpression pair having a containment relationship, and a subexpression pair having neither a containment relationship nor a semantically equivalent relationship.

Workload analyzer 202 may further be configured to provide the labeled subexpressions (shown as labeled subexpressions 214) to featurizer 212. Featurizer 212 may be configured to extract one or more features from labeled subexpressions 214 and remaining subexpressions 219. The feature(s) include, but are not limited, table names referenced by subexpressions 214 and subexpressions 219, logical operators utilized by subexpressions 214 and subexpressions 219 (e.g., join clauses, column predicates, etc.), etc. Featurizer 212 may also featurize runtime statistics associated with each of subexpressions 214 and subexpressions 219. Examples of runtime statistics include, but are not limited, the runtime length for execute the subexpressions 214 and subexpressions 219, a number of row returned by subexpressions 214 and subexpressions 219, etc. Featurizer 212 may obtain the runtime statistics from workload repository 226, or alternatively, workload analyzer 202 may provide the runtime statistics for each of subexpressions 214 and subexpressions 219 to featurizer 212.

Featurizer 212 may be also configured to generate a feature vector (shown as feature vectors 216) for each of labeled subexpressions 214 and subexpressions 219 (shown as feature vectors 220) based on the features described above that are extracted therefor. Feature vectors 216 and feature vectors 220 generated by featurizer 212 may take any form, such as a numerical, visual and/or textual representation, or may comprise any other form suitable for representing subexpressions 214 and subexpressions 219. Featurizer 212 may operate in a number of ways to featurize, or generate a feature vector, for a given subexpression of subexpressions 214 and subexpressions 219. For example and without limitation, featurizer 212 may featurize a given subexpression of subexpressions 214 and subexpressions 219 through time series analysis, keyword featurization, semantic-based featurization, digit count featurization, and/or n-gram-TFIDF featurization.

In accordance with an embodiment, featurizer 212 represents each feature of a feature vector of feature vectors 216 for a given subexpression of subexpressions 214 and a feature vector of feature vectors 220 for a given remaining subexpression of subexpressions 219 using a one-hot encoding. As the number of features (e.g., operators) for a given subexpression of subexpressions 214 and subexpressions 219 may differ, a feature vector generated for one subexpression of subexpressions 214 and subexpressions 219 may have a different length than a feature vector generated for another subexpression of subexpressions 214 and subexpressions 219. As described below, feature vectors 216 and/or feature vectors 220 are input into a machine learning algorithm to perform a classification task. Utilizing feature vectors having variable lengths to accomplish this task may cause the machine learning algorithm to perform inefficiently, as it can be difficult to compare feature vectors of varying length. To prevent this, featurizer 212 is configured to generate feature vectors 216 and feature vectors 220 such that they have the same fixed length. For example, as would be understood by persons of skill in the relevant art(s), featurizer 212 may utilize a tree-based featurization technique to accomplish this, where tree-based convolutions and dynamic pooling operations are performed with respect to query graphs representing subexpressions 214 and subexpressions 219 to generate fixed length feature vectors 216 and fixed length feature vectors 220. Each of feature vectors 216 retain the label that was provided to its associated subexpression by workload analyzer 202. Feature vectors 216 and feature vectors 220 are provided to semi-supervised data set augmentor 204.

Semi-supervised data augmentor 204 is configured to propagate labels to pairs of feature vectors 220 of remaining query subexpressions 219. For instance, semi-supervised data augmentor 204 may comprise a semi-supervised machine learning algorithm that is configured to analyze labeled pairs of feature vectors 216 and learn which types of feature vector pairs received thereby for classification (e.g., feature vectors 220) should be labeled as having a semantically equivalent relationship, a containment relationship, or neither relationship. Semi-supervised data augmentor 204 is configured to propagate the learned labels to respective pairs of feature vectors 220 by utilizing one or more label propagation techniques that are known to those having ordinary skill in the relevant art(s). For instance, a first pair of feature vectors 220 determined to have a semantically equivalent relationship may be labeled as having a semantically equivalent relationship. A second pair of feature vectors 220 determined to have a containment relationship may be labeled as having a containment relationship. A third pair of feature vectors 220 determined to have neither type of relationship may be labeled as having no relationship, and so on and so forth. Such techniques advantageously automatically generate a seed data set that is utilized to train a machine learning algorithm 206, as described below. This way, a user is not required to label hundreds of thousands query subexpressions as having one of the relationships described above. Such techniques also advantageously enable the embodiments described herein to be scalable in various computing environments, including, but not limited to, a cloud-based computing environment that is configured to process hundreds of thousands of queries and maintain an enormous amount (e.g., petabtyes) of data.

Semi-supervised data set augmentor 204 is configured to provide labeled feature vectors 216 and the labeled remaining feature vectors (collectively shown as seed set 222) to machine learning algorithm 206. Machine learning algorithm 206 receives feature vector pairs of seed set 222 that are labeled as having a semantically equivalent relationship as a first input, receives feature vector pairs of seed set 222 that are labeled as having a containment equivalent relationship as a second input, and receive feature vector pairs of seed set 226 that are labeled as having no relationship as a third input. Machine learning algorithm 206 learns what kinds of pairs of subexpressions have a containment equivalent relationship, a semantically equivalent relationship, or no relationship based on the first, second, and third inputs and generates a machine learning model 208 (e.g., comprising a plurality of weight parameters). Machine learning algorithm 206 may utilize logical regression-based techniques or semi-supervised-based techniques to learn the different relationships between subexpression pairs. Machine learning model 208 is utilized to classify new queries that are received by database server application 218.

In accordance with an embodiment, the accuracy of the classifications generated by machine learning model 206 is verified utilizing classification verifier 210. Classification verifier 210 may be configured to execute a deterministic semantically equivalent determination algorithm and a deterministic containment determination algorithm to determine whether classifications generated by machine learning model 208 are correct. An example of a semantically equivalent determination algorithm includes, but is not limited to, a SPES-based algorithm, where, in a first stage, subexpressions are reduced to an algebraic representation that is normalized to minimize structural differences, and in a second stage, a verification algorithm is applied to convert the normalized algebraic expressions to query pair symbolic representations and to prove their equivalence under bag semantics using satisfiability modulo theory. An example of a containment determination algorithm includes, but is not limited to, an arithmetic comparison-based algorithm.

Upon successful verifying that two query subexpressions have at least one of a containment relationship or a semantically equivalent relationship, materialized view generator 224 may generate a materialized view that includes at least a portion of the results generated based on execution of the two query subexpressions and stores the materialized view in view repository 228. For instance, if a first query subexpression and a second subexpression are determined to have a semantically equivalent relationship, view generator 224 may generate a materialized view that includes the results of executing one of the first query subexpression or the second query subexpression. In another example, if a first query subexpression and a second query subexpression are determined to have a containment equivalent relationship (e.g., the results of the first query are included in the results of the second query), view generator 224 may generate a materialized view that includes the results of the second query (i.e., a materialized view is generated for the superset).

In accordance with an embodiment, a materialized view may be generated for each pair of seed set 222 having at least one of a semantically equivalent relationship or a containment relationship. However, such an embodiment assumes that there are no storage constraints with respect to storing materialized views. In accordance with an embodiment in which there are storage constraints, view generator 224 may selectively determine which pairs of seed set 222 are to have materialized views generated therefor. The determination may be based on the runtime statistics associated with such pairs. For example, the determination may be based on the number of processing cycles required to execute quer(ies) (and return results) of a given pair. If the number of processing cycles is above a threshold (i.e., execution of a query is relatively long), then view generator 224 may generate a materialized view for the query. This way, subsequently-received queries that are deemed to have a semantically equivalent relationship or a containment relationship with the query will utilize the materialized view rather than having to execute the query by database server application 218, thereby saving considerable compute resource (e.g., power, processing cycles, memory, etc.).

Accordingly, a materialized view may be generated in many ways. For example, FIG. 3 shows a flowchart 300 of a method for generating a materialized view in accordance with an example embodiment. In an embodiment, flowchart 300 may be implemented by system 200, as shown in FIG. 2. Accordingly, flowchart 300 will be described with continued reference to FIG. 2. Other structural and operational embodiments will be apparent to persons skilled in the relevant art(s) based on the discussion regarding flowchart 300 and system 200 of FIG. 2.

Flowchart 300 begins with step 302. In step 302, a plurality of query expressions from a plurality of previously-executed queries are extracted. For example, with reference to FIG. 2, workload analyzer 202 is configured to extract a plurality of query expressions (e.g., subexpressions) from a plurality of previously-executed queries stored in workload repository 226. The queries stored in workload repository 26 were previously-executed by database server application 218. Workload analyzer 202 may extract the query expressions from query plans maintained by workload repository 226.

In step 304, a plurality of pairs of query expressions are determined from a subset of the plurality of query expressions. Each pair of the plurality of pairs has at least one of a semantically equivalent relationship or a containment relationship with respect to each other. For example, with reference to FIG. 2, workload analyzer 202 determines a plurality of pairs of query expressions from a subset of the plurality of query expressions. For instance, workload analyzer 202 may determine query expressions that reference interesting table sets. Of such determined query expressions, workload analyzer 202 may analyze a certain percentage thereof to determine query expression pairs having at least one of a semantically equivalent relationship or a containment relationship with respect to each other. Workload analyzer 202 may label such query expression pairs as having one or more of such relationships or as having no such relationships. As described above, semi-supervised data augmentor 204 may be configured to utilize semi-supervised machine learning techniques to generate labels for remaining pairs of query expressions that were not labeled by workload analyzer 202.

In step 306, for each pair of the determined plurality of pairs, a materialized view is generated of a result generated based on execution of at least one query expression of the determined pair. For example, with reference to FIG. 2, view generator 224 may generate a materialized view for each pair of the determined plurality pairs.

In step 308, each of the materialized views are stored in storage. For example, with reference to FIG. 2, view generator 224 stores generated materialized views in view repository 228.

FIG. 4 shows a flowchart 400 of a method for generating a machine learning model for classifying a query as having a semantically equivalent relationship or a containment relationship with another query in accordance with an example embodiment. In an embodiment, flowchart 400 may be implemented by system 200, as shown in FIG. 2. Accordingly, flowchart 400 will be described with continued reference to FIG. 2. Other structural and operational embodiments will be apparent to persons skilled in the relevant art(s) based on the discussion regarding flowchart 400 and system 200 of FIG. 2.

Flowchart 400 begins with step 402. In step 402, for each pair of the determined plurality of pairs, a feature vector is generated based on each query expression of the pair. For example, with reference to FIG. 2, featurizer 212 generates feature vectors 216 and feature vectors 220, which correspond to respective pairs of query expressions determined by workload analyzer 202.

In accordance with one or more embodiments, each feature vector comprises at least one of a table name referenced by each respective query expression of each pair, one or more logical operators specified by each respective query expression of each pair, or a number of rows retrieved via execution of each respective query expression of each pair. For example, with reference to FIG. 2, each of feature vectors 216 and feature vectors 220 comprises features representative of at least one of a table name referenced by each respective query expression of each pair, one or more logical operators specified by each respective query expression of each pair, or a number of rows retrieved via execution of each respective query expression of each pair.

In step 404, each generated feature vector is provided as an input to a machine learning algorithm that outputs a machine learning model based on the generated feature vectors. For example, with reference to FIG. 2, machine learning algorithm 206 receives feature vector pairs of seed set 222 that are labeled as having a semantically equivalent relationship as a first input, receives feature vector pairs of seed set 222 that are labeled as having a containment equivalent relationship as a second input, and receive feature vector pairs of seed set 222 that are labeled as having no relationship as a third input. Machine learning algorithm 206 learns what kinds of pairs of subexpressions have a containment equivalent relationship, a semantically equivalent relationship, or no relationship based on the first, second, and third inputs and generates a machine learning model 208 (e.g., comprising a plurality of weight parameters). Machine learning algorithm 206 may utilize logical regression-based techniques or semi-supervised-based techniques to learn the different relationships between subexpression pairs. Machine learning model 208 is utilized to be classify new queries that are received by database server application 218.

Figure 5:
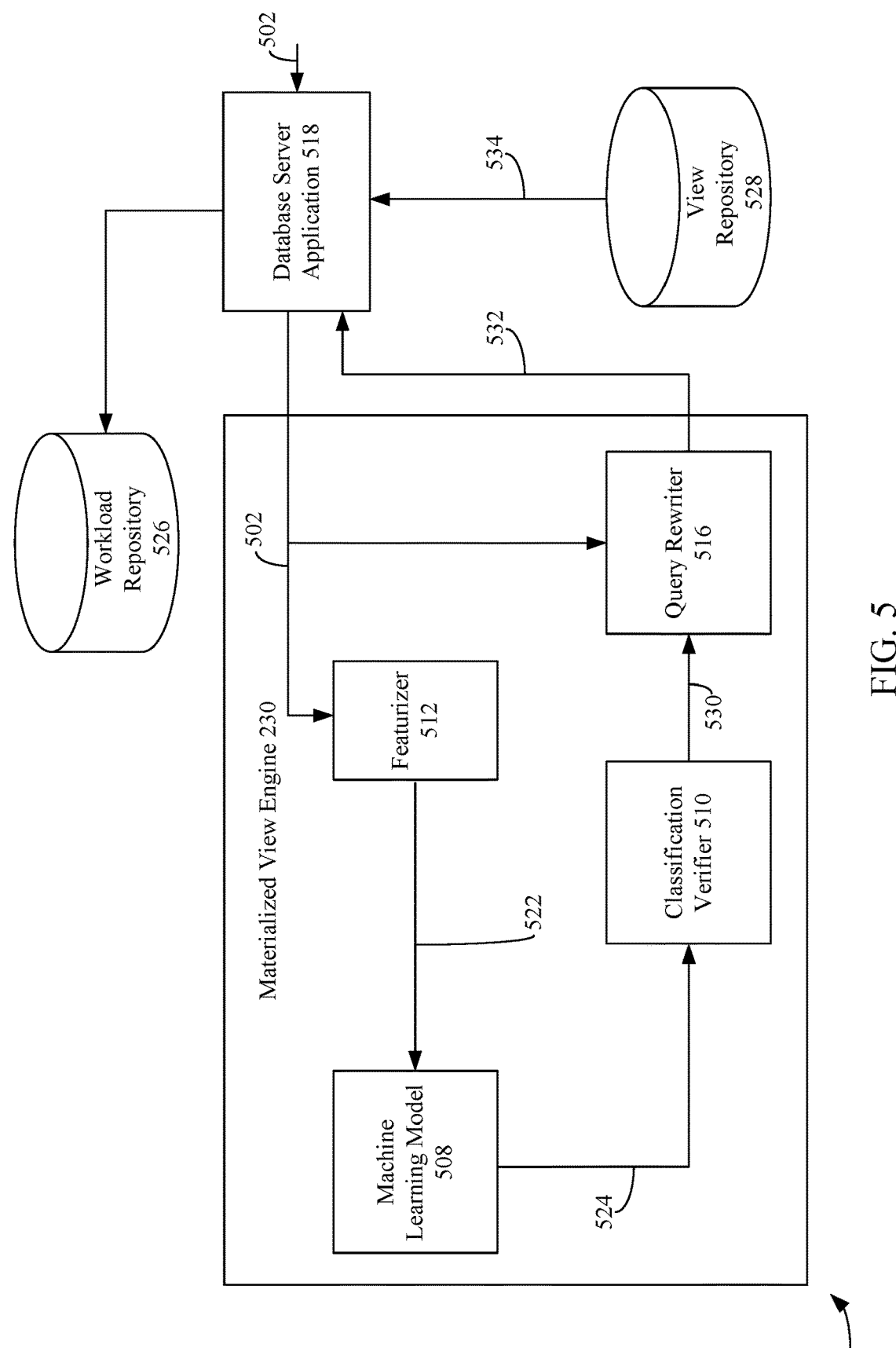
FIG. 5 depicts a block diagram of a system for returning a materialized view in accordance with an example embodiment.

FIG. 5 depicts a block diagram of a system 500 for returning a materialized view in accordance with an example embodiment. As shown in FIG. 5, system 500 comprises a database server application 518, a materialized view engine 530, a workload repository 526, and a materialized view repository 528. Database server application 518 is an example of database server application 218, as described above with reference to FIG. 2. Materialized view engine 530 is an example of materialized view engine 230, as described above with reference to FIG. 2. Workload repository 526 is an example of workload repository 226, as described above with reference to FIG. 2. Materialized view repository 528 is an example of materialized view repository 228, as described above with reference to FIG. 2.

As also shown in FIG. 2, materialized view engine 530 comprises a featurizer 512, a machine learning model 508, a classification verifier 510, and a query rewriter 516. Featurizer 512, machine learning model 508, and classification verifier 510 are examples of featurizer 212, machine learning model 208, and classification verifier 210, as respectively described above with reference to FIG. 2. Other components described above with reference to materialized view engine 230 of FIG. 2 (e.g., workload analyzer 202, semi-supervised data set augmentor 204, machine learning algorithm 206, and/or view generator 224) are not shown in FIG. 5 for the sake of brevity.

Database server application 518 is configured to receive and execute queries, as well as store query plans for such queries (and its subqueries) that it generates in workload repository 526 (as described above with reference to FIG. 2). Materialized view engine 230 may periodically analyze query plans associated with the queries stored in workload repository 526. After machine learning model 508 is generated and deployed, machine learning model 508 may be continued to be updated (i.e., the values of the weight parameters may be updated) to refine the classifications generated thereby utilizing weighted bootstrap-based techniques known to those have ordinary skill in the relevant art(s).

When database server application 518 receives a new query 502 (e.g., after machine learning model 508 is generated and deployed), database server application 518 may provide query 502 to featurizer 512. Featurizer 512 is configured to generate a feature vector (shown as feature vector(s) 522) for each subexpression included in query 502 provided thereto. Each of feature vectors 522 may comprise a plurality of features, including, but not limited to, table names referenced by a respective subexpression of query 502, logical operators utilized by a respective subexpression of query 502, etc. Feature vector(s) 522 may take any form, such as a numerical, visual and/or textual representation, or may comprise any other form suitable for representing subexpressions. Featurizer 512 may operate in a number of ways to featurize, or generate a feature vector, for a given subexpression. For example and without limitation, featurizer 512 may featurize a given subexpression through time series analysis, keyword featurization, semantic-based featurization, digit count featurization, and/or n-gram-TFIDF featurization.

In accordance with an embodiment, featurizer 512 represents each feature of a feature vector of feature vector(s) 522 for a given subexpression using a one-hot encoding. As the number of features (e.g., operators) for a given subexpression may differ, a feature vector generated for one subexpression of query 502 may have a different length than a feature vector generated for another subexpression of query 502. To prevent feature vectors of varying length, featurizer 512 is configured to generate feature vector(s) 522 such that they have the same fixed length. For example, as would be understood by persons of skill in the relevant art(s), featurizer 512 may utilize a tree-based featurization technique to accomplish this, where tree-based convolutions and dynamic pooling operations are performed with respect to query graphs representing the subexpressions to generate fixed length feature vector(s) 522. Feature vector(s) 522 are provided to machine learning model 508.

Machine learning model 508 is configured to output an indication (e.g., a classification 524) as to whether query 502 (corresponding to feature vector(s) 522) comprises a semantically equivalent relationship with another query subexpression for which a materialized view has already been generated, a containment relationship with another query subexpression for which a materialized view has already been generated, or has no such relationships with other query subexpressions for which materialized views have been generated. For instance, machine learning model 508 may compare each of feature vector(s) 522 to feature vectors of subexpressions for which materialized views have been generated to determine whether any of such relationships exist. The feature vectors of subexpressions for which materialized views have been generated may stored by machine learning model 508 or may be retrieved from a data store (e.g., workload repository 526).

In accordance with an embodiment, classification 524 outputted by machine learning model 508 comprises one or more probabilities (e.g., each having a value between 0.0 and 1.0) that a given subexpression of the query has a semantically equivalent relationship with another query subexpression for which a materialized view has already been generated, a containment relationship with another query subexpression for which a materialized view has already been generated, or has no such relationships with other query subexpressions for which materialized views have been generated. Classification 524 is provided to classification verifier 510.

Classification verifier 510 may compare each of the probabilities of classification 524 to a threshold. If any of the probabilities exceeds the threshold, classification verifier 510 may verify classification 524 utilizing a deterministic semantically equivalent determination algorithm and/or a deterministic containment determination algorithm, as described above with reference to FIG. 2. For instance, suppose the threshold is set to 0.90. Further suppose that classification verifier 510 outputs a semantic equivalent probability of 0.95, indicating that a particular subexpression is very likely semantically equivalent to another query subexpression for which a materialized view has already been generated. Because the probability exceeds the threshold, classification verifier 510 may apply a deterministic semantically equivalent determination algorithm to verify classification 524. In another example, suppose that classification verifier 510 outputs a containment probability of 0.92, indicating that a particular subexpression very likely has a containment relationship with another query subexpression for which a materialized view has already been generated. Because the probability exceeds the threshold, classification verifier 510 may apply the deterministic containment determination algorithm to verify classification 524.

In the event that classification determines that classification 524 is correct, classification verifier 510 provides a notification 530 to query rewriter 516. Query rewriter 516 re-formulates the query expression for which classification 524 is generated such that it references the materialized view. For instance, suppose classification 524 indicates that the query subexpression of Code Snippet 3 (as described above) is determined to have a containment relationship with another query for which a materialized view is generated. Query rewriter 516 may re-formulate the subexpression as shown below in Code Snippet 5:

```
SELECT v.empid, v.deptname
FROM V AS v
WHERE hire_date >= '2018-01-01'
    AND hire_date <= '2018-03-30'
        (Snippet 5)
``` where V corresponds to the materialized view generated for the other query.

The re-formulated query (show as re-formulated query 532) is provided to database server application 518. Database server application 518 may retrieve the materialized view referenced by re-formulated query 532 from view repository 528 and returns the materialized view (shown as materialized view 534) as a query result to query 502. The foregoing is performed without database server application 518 having to execute query 502. For instance, database server application 518 is not required to generate a query plan, optimize the query plan, and execute the optimized query plan). In a scenario in which materialized view 534 was generated for a query that has a containment relationship with query 502, a portion of materialized view 534 corresponding to the data requested by the query subexpression of query 502 may be returned to database server application 518. Accordingly, the foregoing techniques advantageously conserve various compute resources (e.g., processing cycles, memory, power, etc.), as the number of queries that are required to be executed is reduced.

In the event that classification verifier 510 determines that classification 524 is incorrect, classification verifier 510 may provide a notification to database server application 518, which indicates to database server application 518 that no materialized view is available for the query. In this case, database server application 518 executes the query (e.g., by parsing the query, validating the query, generating a query plan, optimizing the query plan, and executing the optimized a query plan).

Accordingly, a materialized view may be returned in many ways. For example, FIG. 6 shows a flowchart 600 of a method for returning a materialized view in accordance with an example embodiment. In an embodiment, flowchart 600 may be implemented by system 500, as shown in FIG. 5. Accordingly, flowchart 600 will be described with continued reference to FIG. 5. Other structural and operational embodiments will be apparent to persons skilled in the relevant art(s) based on the discussion regarding flowchart 600 and system 500 of FIG. 5.

Flowchart 600 begins with step 602. In step 602, a query, comprising a first query expression, for a first data set referenced by the first query expression is received. For example, with reference to FIG. 5, featurizer 512 may receive query 502 comprising a query expression from database server application 518. A query subexpression of query 502 may reference (e.g., be configured to retrieve data from) a data set (e.g., data set(s) 122, as shown in FIG. 1).

In step 604, a feature vector is generated based on the first query expression. For example, with reference to FIG. 5, featurizer 512 may generate feature vector(s) 522 based on the query expression included in query 502.

In step 606, the feature vector is provided as an input to a machine learning model that outputs a determination that the first query expression has at least one of a semantically relationship or a containment relationship with respect to a second query expression for which a first materialized view has been generated. For example, with reference to FIG. 5, feature vector(s) 522 are provided as an input to machine learning model 508, which outputs a determination (e.g., classification 524) that the query expression has at least one of a semantically relationship or a containment relationship with respect to another query expression for which a first materialized view has been generated.

In accordance with one or more embodiments, the first query expression has the semantically equivalent relationship with the second query expression when both the first query expression and the second query expression yield a same query result, but comprise different syntax with respect to each other. For example, with reference to FIG. 5, a query expression of query 502 has the semantically equivalent relationship with another query when they both yield a same query result, but comprise different syntax with respect to each other. An example of query expressions having a semantically equivalent relationship are described above with reference to Code Snippets 1 and 2.

In accordance with one or more embodiments, the first query expression has the containment relationship with the second query expression when the first data set is included in a second data set referenced by the second query expression. For example, with reference to FIG. 5, a query expression of query 502 has the containment relationship with another query expression for which a materialized view has been generated when the first data set is included in a second data set referenced by the second query expression. An example of query expressions having a containment relationship are described above with reference to Code Snippets 3 and 4.

In step 608, at least a portion of the first materialized view is returned as a query result to the query. For example, with reference to FIG. 5, database server application 518 retrieves at least a portion of materialized view 534 (that was generated for the other query expression) from view repository 528 and returns it as a query result to query 502.

In accordance with one or more embodiments, query 502 is re-formulated so that it references materialized view 534. For example, FIG. 7 shows a flowchart 700 of a method for re-formulating a query in accordance with an example embodiment. In an embodiment, flowchart 700 may be implemented by system 500, as shown in FIG. 5. Accordingly, flowchart 700 will be described with continued reference to FIG. 5. Other structural and operational embodiments will be apparent to persons skilled in the relevant art(s) based on the discussion regarding flowchart 700 and system 500 of FIG. 5.

Flowchart 700 begins with step 702. In step 702, the first query expression is re-formulated to reference the materialized view. For example, with reference to FIG. 6, query rewriter 516 re-formulates the query expression of query 502 to reference materialized view 534.

In step 704, at least the portion of the materialized view is retrieved via the re-formulated first query expression. For example, with reference to FIG. 5, database server application 518 retrieves at least the portion of materialized view 534 via re-formulated query 532.

III. Example Computer System Implementation

The systems and methods described above in reference to FIGS. 1-7, may be implemented in hardware, or hardware combined with one or both of software and/or firmware. For example, system 800 may be used to implement any of nodes 108A-108N, 112A-112N, and/or 114A-114N, storage node(s) 110A-110N, database server application 118, and materialized view engine 130 of FIG. 1, database server application 218, materialized view engine 230, workload repository 226, view repository 228, workload analyzer 202, featurizer 212, semi-supervised data set augmentor 204, machine learning algorithm 206, machine learning model 208, classification verifier 210, and view generator 224 of FIG. 2, database server application 518, data consistency engine 530, workload repository 526, view repository 528, featurizer 512, machine learning model 508, classification verifier 510, and query rewriter 516 of FIG. 5, and/or any of the components respectively described therein, and flowcharts 300, 400, 600, and/or 700 may be each implemented as computer program code/instructions configured to be executed in one or more processors and stored in a computer readable storage medium. Alternatively, any of nodes 108A-108N, 112A-112N, and/or 114A-114N, storage node(s) 110A-110N, database server application 118, and materialized view engine 130 of FIG. 1, database server application 218, materialized view engine 230, workload repository 226, view repository 228, workload analyzer 202, featurizer 212, semi-supervised data set augmentor 204, machine learning algorithm 206, machine learning model 208, classification verifier 210, and view generator 224 of FIG. 2, database server application 518, data consistency engine 530, workload repository 526, view repository 528, featurizer 512, machine learning model 508, classification verifier 510, and query rewriter 516 of FIG. 5, and/or any of the components respectively described therein, and flowcharts 300, 400, 600, and/or 700 may be implemented as hardware logic/electrical circuitry. In an embodiment, any of nodes 108A-108N, 112A-112N, and/or 114A-114N, storage node(s) 110A-110N, database server application 118, and materialized view engine 130 of FIG. 1, database server application 218, materialized view engine 230, workload repository 226, view repository 228, workload analyzer 202, featurizer 212, semi-supervised data set augmentor 204, machine learning algorithm 206, machine learning model 208, classification verifier 210, and view generator 224 of FIG. 2, database server application 518, data consistency engine 530, workload repository 526, view repository 528, featurizer 512, machine learning model 508, classification verifier 510, and query rewriter 516 of FIG. 5, and/or any of the components respectively described therein, and flowcharts 300, 400, 600, and/or 700 may be implemented in one or more SoCs (system on chip). An SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 8:
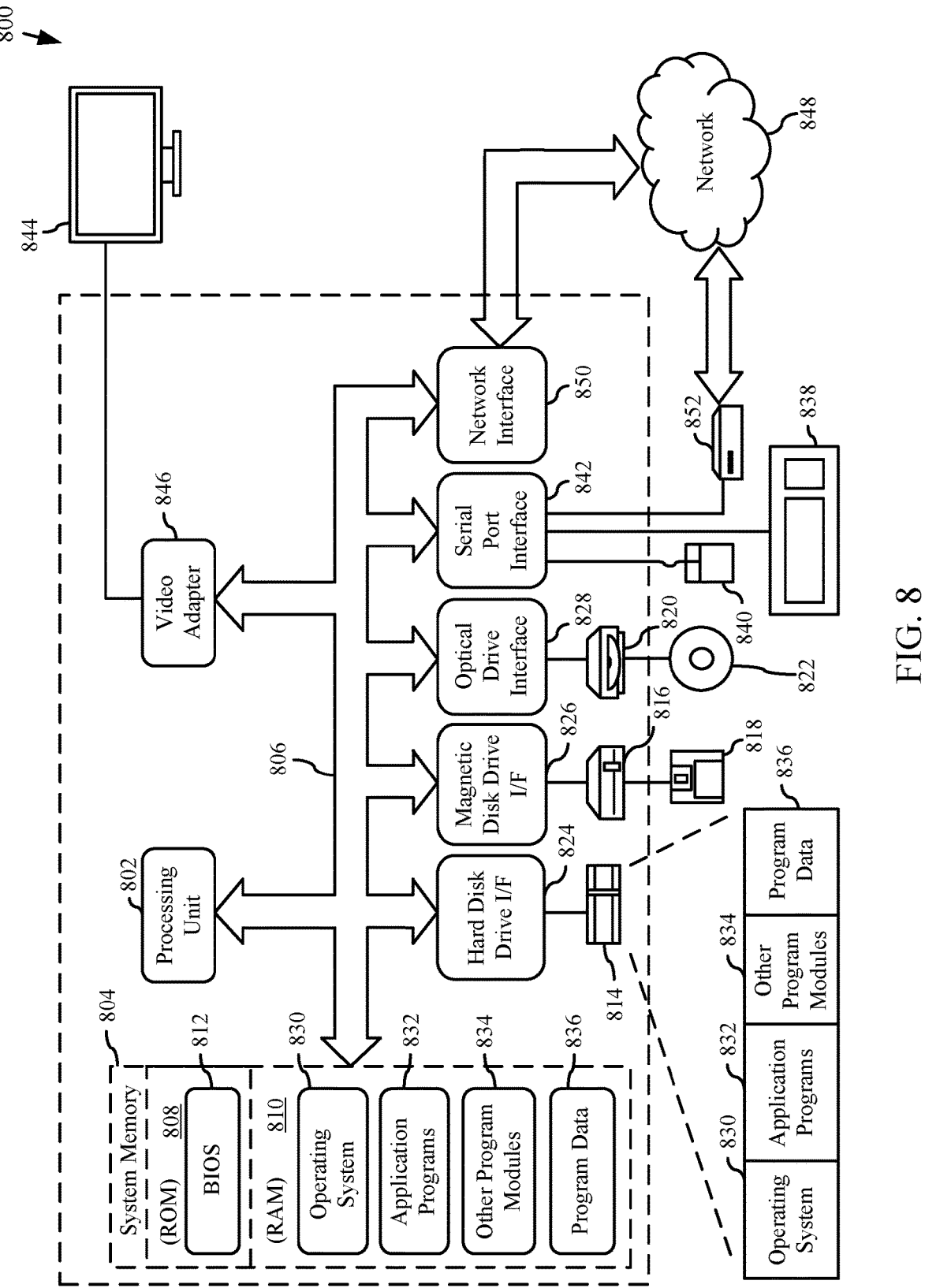
FIG. 8 is a block diagram of an example processor-based computer system that may be used to implement various embodiments.

FIG. 8 depicts an exemplary implementation of a computing device 800 in which embodiments may be implemented, including any of nodes 108A-108N, 112A-112N, and/or 114A-114N, storage node(s) 110A-110N, database server application 118, and materialized view engine 130 of FIG. 1, database server application 218, materialized view engine 230, workload repository 226, view repository 228, workload analyzer 202, featurizer 212, semi-supervised data set augmentor 204, machine learning algorithm 206, machine learning model 208, classification verifier 210, and view generator 224 of FIG. 2, database server application

518, data consistency engine 530, workload repository 526, view repository 528, featurizer 512, machine learning model 508, classification verifier 510, and query rewriter 516 of FIG. 5, and/or any of the components respectively described therein, and flowcharts 300, 400, 600, and/or 700. The description of computing device 800 provided herein is provided for purposes of illustration, and is not intended to be limiting. Embodiments may be implemented in further types of computer systems, as would be known to persons skilled in the relevant art(s).

As shown in FIG. 8, computing device 800 includes one or more processors, referred to as processor circuit 802, a system memory 804, and a bus 806 that couples various system components including system memory 804 to processor circuit 802. Processor circuit 802 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 802 may execute program code stored in a computer readable medium, such as program code of operating system 830, application programs 832, other programs 834, etc. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random access memory (RAM) 810. A basic input/output system 812 (BIOS) is stored in ROM 808.

Computing device 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 830, one or more application programs 832, other programs 834, and program data 836. Application programs 832 or other programs 834 may include, for example, computer program logic (e.g., computer program code or instructions) for implementing the systems described above, including the embodiments described above with reference to FIGS. 1-7.

A user may enter commands and information into the computing device 800 through input devices such as keyboard 838 and pointing device 840. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 802 through a serial port interface 842 that is coupled to bus 806, but may be connected by other interfaces, such as a parallel port, game port, or a universal serial bus (USB).

A display screen 844 is also connected to bus 806 via an interface, such as a video adapter 846. Display screen 844 may be external to, or incorporated in computing device 800. Display screen 844 may display information, as well as being a user interface for receiving user commands and/or other information (e.g., by touch, finger gestures, a virtual keyboard, by providing a tap input (where a user lightly presses and quickly releases display screen 844), by providing a "touch-and-hold" input (where a user touches and holds his finger (or touch instrument) on display screen 844 for a predetermined period of time), by providing touch input that exceeds a predetermined pressure threshold, etc.). In addition to display screen 844, computing device 800 may include other peripheral output devices (not shown) such as speakers and printers.

Computing device 800 is connected to a network 848 (e.g., the Internet) through an adaptor or network interface 850, a modem 852, or other means for establishing communications over the network. Modem 852, which may be internal or external, may be connected to bus 806 via serial port interface 842, as shown in FIG. 8, or may be connected to bus 806 using another interface type, including a parallel interface.

As used herein, the terms "computer program medium," "computer-readable medium," and "computer-readable storage medium" are used to generally refer to physical hardware media such as the hard disk associated with hard disk drive 814, removable magnetic disk 818, removable optical disk 822, other physical hardware media such as RAMs, ROMs, flash memory cards, digital video disks, zip disks, MEMs, nanotechnology-based storage devices, and further types of physical/tangible hardware storage media (including system memory 804 of FIG. 8). Such computer-readable storage media are distinguished from and non-overlapping with communication media and propagating signals (do not include communication media and propagating signals). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media.

As noted above, computer programs and modules (including application programs 832 and other programs 834) may be stored on the hard disk, magnetic disk, optical disk, ROM, RAM, or other hardware storage medium. Such computer programs may also be received via network interface 850, serial port interface 852, or any other interface type. Such computer programs, when executed or loaded by an application, enable computing device 800 to implement features of embodiments discussed herein. Accordingly, such computer programs represent controllers of the computing device 800.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Further Example Embodiments

A system is described herein. The system includes: at least one processor circuit; and at least one memory that stores program code configured to be executed by the at least one processor circuit, the program code comprising: a materialized view engine configured to: receive a query, comprising a first query expression, for a first data set referenced by the first query expression; generate a feature vector based on the first query expression; provide the feature vector as an input to a machine learning model that outputs a determination that the first query expression has at least one of a semantically equivalent relationship or a containment relationship with respect to a second query expression for which a first materialized view has been generated; and responsive to determining that the first query expression has at least one of the semantically equivalent relationship or the containment relationship with respect to the second query expression, return at least a portion of the first materialized view as a query result to the query.

In one implementation of the foregoing system, the materialized view engine is configured to return at least the portion of the first materialized view as the query result to the query by: re-formulating the first query expression to reference the materialized view; and retrieving at least the portion of the materialized view via the re-formulated first query expression.

In one implementation of the foregoing system, the materialized view engine is further configured to: extract a plurality of query expressions from a plurality of previously-executed queries; determine a plurality of pairs of query expressions from a subset of the plurality of query expressions, each pair of the plurality of pairs having at least one of the semantically equivalent relationship or the containment relationship with respect to each other; for each pair of the determined plurality of pairs, generate a second materialized view of a result generated based on execution of at least one query expression of the determined pair; and store each of the second materialized views in storage, the first materialized view being one of the second materialized views.

In one implementation of the foregoing system, the materialized view engine is further configured to: for each pair of the determined plurality of pairs: generate a second feature vector based on each query expression of the pair; and provide each generated second feature vector as an input to a machine learning algorithm that outputs the machine learning model based on the generated second feature vectors.

In one implementation of the foregoing system, each second feature vector comprises at least one of: a table name referenced by each respective query expression of each pair; one or more logical operators specified by each respective query expression of each pair; or a number of rows retrieved via execution of each respective query expression of each pair.

In one implementation of the foregoing system, the first query expression has the containment relationship with the second query expression when the first data set is included in a second data set referenced by the second query expression.

In one implementation of the foregoing system, the first query expression has the semantically equivalent relationship with the second query expression when both the first query expression and the second query expression yield a same query result, but comprise different syntax with respect to each other.

A method is also described herein. The method includes: receiving a query, comprising a first query expression, for a first data set referenced by the first query expression; generating a feature vector based on the first query expression; providing the feature vector as an input to a machine learning model that outputs a determination that the first query expression has at least one of a semantically equivalent relationship or a containment relationship with respect to a second query expression for which a first materialized view has been generated; responsive to determining that the first query expression has at least one of the semantically equivalent relationship or the containment relationship with respect to the second query expression, returning at least a portion of the first materialized view as a query result to the query.

In one implementation of the foregoing method, said returning comprises: re-formulating the first query expression to reference the materialized view; and retrieving at least the portion of the materialized view via the re-formulated first query expression.

In one implementation of the foregoing method, the method further includes: extracting a plurality of query expressions from a plurality of previously-executed queries; determining a plurality of pairs of query expressions from a subset of the plurality of query expressions, each pair of the plurality of pairs having at least one of the semantically equivalent relationship or the containment relationship with respect to each other; for each pair of the determined plurality of pairs, generating a second materialized view of a result generated based on execution of at least one query expression of the determined pair; and storing each of the second materialized views in storage, the first materialized view being one of the second materialized views.

In one implementation of the foregoing method, the method further includes: for each pair of the determined plurality of pairs: generating a second feature vector based on each query expression of the pair; and providing each generated second feature vector as an input to a machine learning algorithm that outputs the machine learning model based on the generated second feature vectors.

In one implementation of the foregoing method, each second feature vector comprises at least one of: a table name referenced by each respective query expression of each pair; one or more logical operators specified by each respective query expression of each pair; or a number of rows retrieved via execution of each respective query expression of each pair.

In one implementation of the foregoing method, the first query expression has the containment relationship with the second query expression when the first data set is included in a second data set referenced by the second query expression.

In one implementation of the foregoing method, the first query expression has the semantically equivalent relationship with the second query expression when both the first query expression and the second query expression yield a same query result, but comprise different syntax with respect to each other.

A computer-readable storage medium having program instructions recorded thereon that, when executed by at least one processor, perform a method. The method includes: receiving a query, comprising a first query expression, for a first data set referenced by the first query expression; generating a feature vector based on the first query expression; providing the feature vector as an input to a machine learning model that outputs a determination that the first query expression has at least one of a semantically equivalent relationship or a containment relationship with respect to a second query expression for which a first materialized view has been generated; and responsive to determining that the first query expression has at least one of the semantically equivalent relationship or the containment relationship with respect to the second query expression, returning at least a portion of the first materialized view as a query result to the query.

In one implementation of the foregoing computer-readable storage medium, said returning comprises: re-formulating the first query expression to reference the materialized view; and retrieving at least the portion of the materialized view via the re-formulated first query expression.

In one implementation of the foregoing computer-readable storage medium, the method further comprising: extracting a plurality of query expressions from a plurality of previously-executed queries; determining a plurality of pairs of query expressions from a subset of the plurality of query expressions, each pair of the plurality of pairs having at least one of the semantically equivalent relationship or the containment relationship with respect to each other; for each pair of the determined plurality of pairs, generating a second materialized view of a result generated based on execution of at least one query expression of the determined pair; and storing each of the second materialized views in storage, the first materialized view being one of the second materialized views.

In one implementation of the foregoing computer-readable storage medium, the method further includes: for each pair of the determined plurality of pairs: generating a second feature vector based on each query expression of the pair; and providing each generated second feature vector as an input to a machine learning algorithm that outputs the machine learning model based on the generated second feature vectors.

In one implementation of the foregoing computer-readable storage medium, each second feature vector comprises at least one of: a table name referenced by each respective query expression of each pair; one or more logical operators specified by each respective query expression of each pair; or a number of rows retrieved via execution of each respective query expression of each pair.

In one implementation of the foregoing computer-readable storage medium, the first query expression has the containment relationship with the second query expression when the first data set is included in a second data set referenced by the second query expression.

V. Conclusion

While various example embodiments have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosure should not be limited by any of the above-described example embodiments, but should be defined only in accordance with the following claims and their equivalents.

What is claimed is:

1. A system, comprising:

a processor circuit; and a memory that stores program code configured to be executed by the processor circuit, the program code comprising:

a materialized view engine that:

determines a first runtime statistic associated with an execution of a first query expression fails to exceed a threshold;

responsive to the determination that the first runtime statistic fails to exceed the threshold, determines to forgo generation of a first materialized view for the first query expression;

determines a second runtime statistic associated with an execution of a second query expression exceeds the threshold;

responsive to the determination that the second runtime statistic exceeds the threshold, generates a second materialized view for the second query expression;

stores the second materialized view in a storage;

receives a query, comprising a third query expression, for a first data set referenced by the third query expression;

generates a first feature vector based on the third query expression, the first feature vector comprising a plurality of features of the third query expression;

provides the first feature vector as an input to a machine learning model;

receives, from the machine learning model, an output comprising a determination that the third query expression has at least one of a semantically equivalent relationship or a containment relationship with respect to the second query expression;

responsive to receiving the output, obtains, from the storage, at least a portion of the second materialized view; and returns the at least the portion of the second materialized view as a query result to the query.

2. The system of claim 1, wherein the materialized view engine returns the at least the portion of the second materialized view as the query result to the query by:

re-formulating the third query expression to reference the second materialized view; and retrieving at least the portion of the materialized view via the re-formulated third query expression.

3. The system of claim 1, wherein the materialized view engine further:

extracts a plurality of query expressions from a plurality of previously-executed queries;

determines a plurality of pairs of query expressions from a subset of the plurality of query expressions, each pair of the plurality of pairs having at least one of the semantically equivalent relationship or the containment relationship with respect to each other;

for each pair of the determined plurality of pairs, generates a third materialized view of a result generated based on execution of at least one query expression of the determined pair; and stores each of the third materialized views in the storage, the second materialized view being one of the third materialized views.

4. The system of claim 3, wherein the materialized view engine further:

for each pair of the determined plurality of pairs:

generates a second feature vector based on each query expression of the pair; and provides each second feature vector as an input to a machine learning algorithm, causing the machine learning algorithm to output the machine learning model based on the second feature vectors.

5. The system of claim 4, wherein each second feature vector comprises at least one of:

a table name referenced by each respective query expression of each pair;

one or more logical operators specified by each respective query expression of each pair; or a number of rows retrieved via execution of each respective query expression of each pair.

6. The system of claim 1, wherein the third query expression has the containment relationship with the second query expression when the first data set is included in a second data set referenced by the second query expression.

7. The system of claim 1, wherein the third query expression has the semantically equivalent relationship with the second query expression when both the third query expression and the second query expression yield a same query result, but comprise different syntax with respect to each other.

8. A method, comprising:

determining a first runtime statistic associated with an execution of a first query expression fails to satisfy a threshold, responsive to said determining the first runtime statistic fails to satisfy the threshold, forgoing generation of a first materialized view for the first query expression;

determining a second runtime statistic associated with an execution of a second query expression satisfies the threshold;

responsive to said determining the second runtime statistic satisfies the threshold, generating a second materialized view for the second query expression;

receiving a query, comprising a third query expression, for a first data set referenced by the third query expression;

generating a first feature vector based on the third query expression, the first feature vector comprising a plurality of features of the third query expression;

providing the first feature vector as an input to a machine learning model;

receiving, from the machine learning model, an output comprising a determination that the third query expression has at least one of a semantically equivalent relationship or a containment relationship with respect to the second query expression; and responsive to said receiving the output, returning at least a portion of the second materialized view as a query result to the query.

9. The method of claim 8, wherein said returning comprises:

re-formulating the third query expression to reference the second materialized view; and retrieving the at least the portion of the second materialized view via the re-formulated third query expression.

10. The method of claim 8, further comprising:

extracting a plurality of query expressions from a plurality of previously-executed queries;

determining a plurality of pairs of query expressions from a subset of the plurality of query expressions, each pair of the plurality of pairs having at least one of the semantically equivalent relationship or the containment relationship with respect to each other;

for each pair of the determined plurality of pairs, generating a third materialized view of a result generated based on execution of at least one query expression of the determined pair; and storing each of the third materialized views in a storage, the second materialized view being one of the third materialized views.

11. The method of claim 10, further comprising:

for each pair of the determined plurality of pairs:

generating a second feature vector based on each query expression of the pair; and providing each second feature vector as an input to a machine learning algorithm, said providing each second feature vector as the input causing the machine learning algorithm to output the machine learning model based on the second feature vectors.

12. The method of claim 11, wherein each second feature vector comprises at least one of:

a table name referenced by each respective query expression of each pair;

one or more logical operators specified by each respective query expression of each pair; or a number of rows retrieved via execution of each respective query expression of each pair.

13. The method of claim 8, wherein the third query expression has the containment relationship with the second query expression when the first data set is included in a second data set referenced by the second query expression.

14. The method of claim 8, wherein the third query expression has the semantically equivalent relationship with the second query expression when both the third query expression and the second query expression yield a same query result, but comprise different syntax with respect to each other.

15. A computer-readable storage medium having program instructions recorded thereon that, when executed by at least one processor, perform a method comprising:

determining a first runtime statistic associated with an execution of a first query expression fails to satisfy a threshold;

responsive to said determining the first runtime statistic fails to satisfy the threshold, foregoing generation of a first materialized view for the first query expression;

determining a second runtime statistic associated with an execution of a second query expression satisfies the threshold;

responsive to said determining the second runtime statistic satisfies the threshold, generating a second materialized view for the second query expression;

receiving a query, comprising a third query expression, for a first data set referenced by the third query expression;

generating a first feature vector based on the third query expression, the first feature vector comprising a plurality of features of the third query expression;

providing the first feature vector as an input to a machine learning model;

receiving, from the machine learning model, an output comprising a determination that the third query expression has at least one of a semantically equivalent relationship or a containment relationship with respect to the second query expression;

responsive said receiving, returning at least a portion of the second materialized view as a query result to the query.

16. The computer-readable storage medium of claim 15, said returning comprising:

re-formulating the third query expression to reference the second materialized view; and retrieving the at least the portion of the second materialized view via the re-formulated third query expression.

17. The computer-readable storage medium of claim 15, the method further comprising:

extracting a plurality of query expressions from a plurality of previously-executed queries;

determining a plurality of pairs of query expressions from a subset of the plurality of query expressions, each pair of the plurality of pairs having at least one of the semantically equivalent relationship or the containment relationship with respect to each other;

for each pair of the determined plurality of pairs, generating a third materialized view of a result generated based on execution of at least one query expression of the determined pair; and storing each of the third materialized views in a storage, the second materialized view being one of the third materialized views.

18. The computer-readable storage medium of claim 17, the method further comprising:

for each pair of the determined plurality of pairs:

generating a second feature vector based on each query expression of the pair; and providing each generated second feature vector as an input to a machine learning algorithm, said providing each generated second feature vector as the input causing the machine learning algorithm to output the machine learning model based on the generated second feature vectors.

19. The computer-readable storage medium of claim 18, wherein each second feature vector comprises at least one of:

a table name referenced by each respective query expression of each pair;

one or more logical operators specified by each respective query expression of each pair; or a number of rows retrieved via execution of each respective query expression of each pair.

20. The computer-readable storage medium of claim 15, wherein the third query expression has the containment relationship with the second query expression when the first data set is included in a second data set referenced by the second query expression.

* * * * *